US012637328B2

(12) United States Patent
Kukkola et al.

(10) Patent No.: US 12,637,328 B2
(45) Date of Patent: May 26, 2026

(54) CONSTRUCTION ARRANGEMENT OF AN ELEVATOR AND METHOD FOR CONSTRUCTING AN ELEVATOR

(71) Applicant: Kone Corporation, Helsinki (FI)

(72) Inventors: Mikko Kukkola, Helsinki (FI); Mika Ijäs, Helsinki (FI); Matti Räsänen, Helsinki (FI); Markku Haapaniemi, Helsinki (FI); Otto Lanz, Helsinki (FI); Janne Laine, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/663,483

(22) Filed: May 14, 2024

(65) Prior Publication Data

US 2024/0294361 A1 Sep. 5, 2024

Related U.S. Application Data

(63) Continuation of application No. PCT/EP2021/081664, filed on Nov. 15, 2021.

(51) Int. Cl.

| | |
|---|---|
| ***B66B 11/00*** | (2006.01) |
| ***B66B 7/02*** | (2006.01) |
| ***B66B 19/00*** | (2006.01) |

(52) U.S. Cl.
CPC ............ *B66B 11/0045* (2013.01); *B66B 7/02* (2013.01); *B66B 19/00* (2013.01)

(58) Field of Classification Search
CPC ..... B66B 11/0045; B66B 7/02; B66B 19/005; B66B 19/00; B66B 19/002
See application file for complete search history.

(56) References Cited

U.S. PATENT DOCUMENTS 6,446,762 B1 * 9/2002 St. Pierre ................ B66B 7/024 187/408
6,488,124 B1 12/2002 Yasuda et al.
(Continued)

FOREIGN PATENT DOCUMENTS

DE 202016103634 U1 * 12/2016
EP 1405812 A1 4/2004
WO WO-2017203633 A1 * 11/2017 ........... B66B 19/002

OTHER PUBLICATIONS

International Search Report for International Application and Written Opinion of the International Searching Authority for International Application No. PCT/EP2021/081664 dated Jul. 18, 2022.

*Primary Examiner* — Minh Truong
*Assistant Examiner* — Michelle M Mudwilder
(74) *Attorney, Agent, or Firm* — Harness, Dickey & Pierce, P.L.C.

(57) ABSTRACT

A construction arrangement of an elevator and a method for constructing an elevator. The construction arrangement of an elevator comprises a hoistway; at least one car guide rail and at least one counterweight guide rail mounted to the structure of the hoistway; an elevator car arranged movable on said at least one car guide rail; a counterweight arranged movable on said at least one counterweight guide rail; and a hoisting machine arranged above the counterweight; wherein the hoisting machine is mounted substantially between said at least one car guide rail and said at least one counterweight guide rail. The method for constructing an elevator comprising providing said construction arrangement, moving the hoisting machine from a first installation position to an upper second installation position in the hoistway, and mounting the hoisting machine substantially between said at least one car guide rail and said at least one counterweight guide rail.

17 Claims, 4 Drawing Sheets

(56) References Cited

U.S. PATENT DOCUMENTS

| | | | | |
|---|---|---|---|---|
| 6,655,500 | B2 * | 12/2003 | Orrman | B66B 11/008 187/254 |
| 6,672,013 | B1 * | 1/2004 | Glassey | B66B 19/002 187/408 |
| 6,742,628 | B2 * | 6/2004 | Bauer | B66B 11/008 187/254 |
| 6,848,543 | B2 * | 2/2005 | Adifon | B66B 7/021 187/254 |
| 6,991,069 | B1 * | 1/2006 | Ach | B66B 11/0045 187/254 |
| 10,246,299 | B2 * | 4/2019 | Fargo | B66B 11/0045 |
| 10,252,889 | B2 * | 4/2019 | Bruno | B66B 11/04 |
| 10,384,912 | B2 * | 8/2019 | Watanabe | B66B 7/02 |
| 2007/0181381 | A1 * | 8/2007 | Jungbauer | B66B 9/187 187/401 |
| 2015/0083525 | A1 | 3/2015 | Bruno et al. | |
| 2023/0020453 | A1 * | 1/2023 | Medeiros | B66B 19/00 |

* cited by examiner

CONSTRUCTION ARRANGEMENT OF AN ELEVATOR AND METHOD FOR CONSTRUCTING AN ELEVATOR

CROSS-REFERENCE TO RELATED APPLICATION

This application is a continuation of PCT International Application No. PCT/EP2021/081664 which has an International filing date of Nov. 15, 2021, the entire contents of which are incorporated herein by reference.

FIELD OF THE INVENTION

The invention relates to a construction arrangement of an elevator and a method for constructing an elevator. The elevator is preferably an elevator for transporting passengers and/or goods.

BACKGROUND OF THE INVENTION

Conventionally, an elevator has been installed at the same time as the height of the building increases and will be used as efficiently as possible from the start of construction to the end users. As the elevator installation progresses, the elevator machinery and control panels will be moved upwards as the building grows, and the ropes will be lengthened, allowing the elevator to serve the elevator users as efficiently as possible at different stages of the building.

In a multi-sectional elevator installation, the building floor height is increased by first transferring the electrical components and the car cable up to the next highest floor, then hoisting and installing the hoisting machine to the next height behind the car guide rail, and finally transporting the car and the first and second rope fixings upwards with three hoisting devices, which involves many risks.

After the transfer, the counterweight guide rail, which is located behind the hoisting machine, remains to be installed and cannot be installed before the hoisting machine is relocated.

When the elevator car travel length is extended, the hoisting machine attached to the back of the car guide rail is demounted and moved up to a new location. The car guide rail is mounted to the hoistway structure by car guide rail brackets. In the conventional case, the ropes are required to be moved to the other side of the car guide rail brackets when the hoisting machine is moved up. Alternatively, the car guide rail brackets must be replaced with other car guide rail brackets, which takes up a considerable amount of the time the elevator could be in use. This also requires additional tools and hoisting devices, which take time to install.

SUMMARY OF THE INVENTION

The object of the invention is to introduce an improved construction arrangement of an elevator and a method for constructing an elevator. An object is to introduce a solution by which one or more of the above defined problems of prior art and/or drawbacks discussed or implied elsewhere in the description can be solved. An object is to provide a solution with improved safety and ergonomics at work. An object is to reduce the time needed to install and recommission an elevator when increasing the floor height.

It is brought forward a new construction arrangement of an elevator comprising a hoistway; at least one car guide rail and at least one counterweight guide rail mounted to the structure of the hoistway; an elevator car arranged movable on said at least one car guide rail; a counterweight arranged movable on said at least one counterweight guide rail; and a hoisting machine arranged above the counterweight. The hoisting machine is mounted substantially between said at least one car guide rail and said at least one counterweight guide rail.

According to an embodiment the hoisting machine is mounted by means of a mounting structure between said at least one car guide rail and said at least one counterweight guide rail.

According to an embodiment the mounting structure is mounted to said at least one car guide rail and said at least one counterweight guide rail.

According to an embodiment the mounting structure is mounted on the back of said at least one car guide rail and on the back of said at least one counterweight guide rail.

According to an embodiment said at least one car guide rail is mounted by car guide rail brackets to the structure of the hoistway and said at least one counterweight guide rail is mounted by counterweight guide rail brackets to the structure of the hoistway, and the mounting structure is mounted to a car guide rail bracket and a counterweight guide rail bracket.

According to an embodiment the hoisting machine is mounted by means of a mounting structure directly to the hoistway structure.

According to an embodiment additionally to the mounting of the hoisting machine to the mounting structure, the mounting structure comprises an integrated first rope fixing for a plurality of hoisting ropes comprised by the arrangement.

According to an embodiment the hoisting machine comprises a drive wheel positioned towards the structure of the hoistway which provides mounting structure for the adjacent car guide rail.

According to an embodiment the hoisting machine comprises a drive wheel positioned towards the car.

According to an embodiment the hoisting machine is placed on the counterweight guide rail, when viewed horizontally.

According to an embodiment the hoisting machine is configured to be demounted from a first installation position in the hoistway and to be mounted to an upper second installation position in the hoistway, and the second installation position is provided with car guide rails and counterweight guide rails forming continuing car guide rail lines and continuing counterweight guide rail lines to the bottom portion of the hoistway before said demounting.

It is also brought forward a new method for constructing an elevator comprising providing a construction arrangement according to claim 1, and moving the hoisting machine from a first installation position to an upper second installation position in the hoistway, and mounting the hoisting machine substantially between said at least one car guide rail and said at least one counterweight guide rail.

According to an embodiment the method comprises mounting the hoisting machine by means of a mounting structure between said at least one car guide rail and said at least one counterweight guide rail.

According to an embodiment the method comprises mounting the mounting structure to said at least one car guide rail and said at least one counterweight guide rail.

According to an embodiment the method comprises mounting the mounting structure on the back of said at least one car guide rail and on the back of said at least one counterweight guide rail.

According to an embodiment the method comprises mounting said at least one car guide rail by car guide rail brackets to the structure of the hoistway and said at least one counterweight guide rail by counterweight guide rail brackets to the structure of the hoistway, and mounting the mounting structure to a car guide rail bracket and a counterweight guide rail bracket.

According to an embodiment the method comprises mounting the hoisting machine by means of a mounting structure directly to the hoistway structure.

According to an embodiment the method comprises, additionally to the mounting of the hoisting machine to the mounting structure, integrating a first rope fixing to the mounting structure to form an integrated first rope fixing for a plurality of hoisting ropes.

According to an embodiment the method comprises positioning a drive wheel comprised by the hoisting machine towards the structure of the hoistway which provides mounting structure for the adjacent car guide rail.

According to an embodiment the method comprises positioning a drive wheel comprised by the hoisting machine towards the car.

According to an embodiment the method comprises placing the hoisting machine on the counterweight guide rail, when viewed horizontally.

According to an embodiment the method comprises mounting car guide rails and counterweight guide rails in the hoistway upper second installation position above the hoisting machine thereby forming continuing car guide rail lines and continuing counterweight guide rail lines to the bottom portion of the hoistway, when the hoisting machine is mounted in place in the first installation position.

According to an embodiment the method comprises demounting the hoisting machine from the first installation position and mounting the hoisting machine to the upper second installation position.

According to an embodiment the method comprises moving the hoisting machine mounted to a mounting structure, together with a first rope fixing integrated to said mounting structure, between said at least one car guide rail and said at least one counterweight guide rail.

According to an embodiment the method comprises demounting the mounting structure from between said at least one car guide rail and said at least one counterweight guide rail in the first installation position, and mounting the mounting structure between said at least one car guide rail and said at least one counterweight guide rail in the upper second installation position.

According to an embodiment the method comprises demounting a second rope fixing comprised by the construction arrangement from the first installation position and mounting second rope fixing to the upper second installation position.

According to an embodiment the method comprises providing a hoisting arrangement in the hoistway above the car capable of hoisting loads in the hoistway, the hoisting arrangement preferably comprising a hoisting device, a flexible member, and an installation platform.

According to an embodiment the method comprises attaching to the hoisting arrangement, and supporting and moving, preferably simultaneously, by said hoisting arrangement from the first installation position to the upper second installation position, at least one of the following: the hoisting machine; a first rope fixing comprised by the construction arrangement; a second rope fixing comprised by the construction arrangement; the car; and a mounting structure comprised by the construction arrangement together with the hoisting machine and the first rope fixing.

According to an embodiment the method comprises: at least one of the following: the hoisting machine; the first rope fixing; the second rope fixing; the car; and the mounting structure together with the hoisting machine and the first rope fixing, is attached to the installation platform, and supported and moved by said installation platform.

By the invention the time needed to install and recommission an elevator when increasing the floor height of a building can be reduced. The method and the arrangement can speed up the construction of the elevator. The installation of the elevator can continue above the elevator in use in all respects. Also, the invention allows the use of wider and narrower counterweights, thus achieving greater utilization of the hoistway. This will bring great benefits to the customer in terms of increased elevator car size, increased elevator uptime in terms of reduced time to stretch the elevator, and improved installation safety. When the hoisting machine is to be moved up and installed again, the other side of the roping passing around the hoisting machine drive pulley needs not be moved to the other side of the car guide rail brackets.

Preferable further details of the invention are introduced in the following, which further details can be combined individually or in any combination.

BRIEF DESCRIPTION OF THE DRAWINGS

In the following the present invention will be described in closer detail by means of preferred embodiments with reference to the attached drawings, in which.

DETAILED DESCRIPTION

Figure 1:
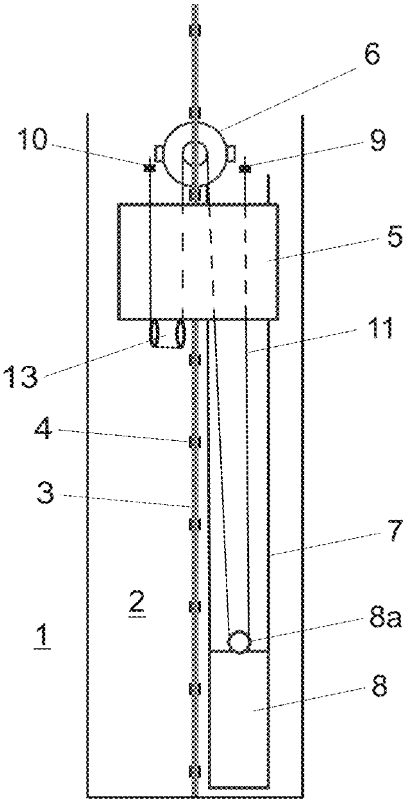
PRIOR ART FIG. 1
FIG. 1 illustrates a prior art construction arrangement of an elevator.

FIG. 1 illustrates a prior art elevator construction arrangement comprising a hoistway 2 formed in a building 1. The arrangement comprises elevator car guide rails 3 mounted by car guide rail brackets 4 to the walls of the hoistway and an elevator car 5 arranged movable on the car guide rails. The arrangement comprises a hoisting machine 6, counterweight guide rails 7, a counterweight 8, a first rope fixing 9, a second rope fixing 10 and a roping 11. The counterweight is arranged movable on the counterweight guide rails. A pulley beam 13 is attached to the underside of the car 5 for the roping 11.

The ropes 11 pass from the first rope fixing 9 down to a counterweight pulley 8*a* connected to the counterweight. Thereafter the ropes pass up to the hoisting machine 6, and from there down under the car 5, via the pulley beam 13, up to the second rope fixing 10 on the opposite side of the hoistway 2.

The hoisting machine 6 is disposed behind the car guide rail 3, between the car guide rail 3 and the wall of the hoistway 2. When the elevator car 5 travel length is extended, the hoisting machine 6 attached to the back of the car guide rail 3 is demounted and moved up to a new location. The ropes 11 are required to be moved to the other side of the car guide rail brackets 4 when the hoisting machine is moved up. Alternatively, the car guide rail brackets 4 must be replaced with other car guide rail brackets.

Figure 2:
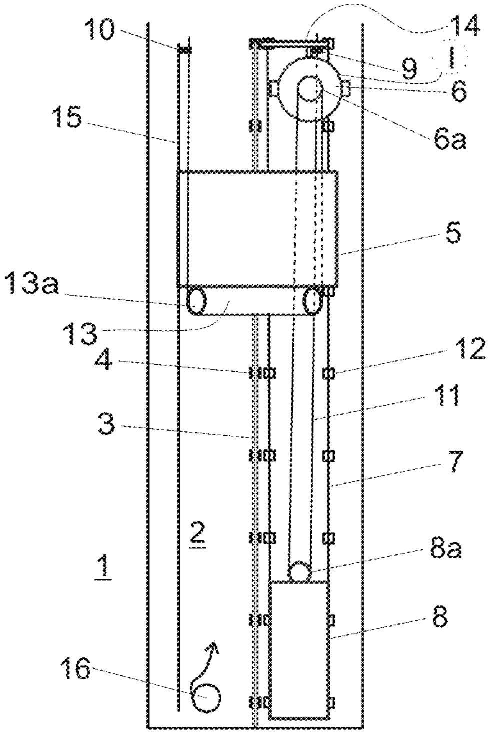
FIG. 2 illustrates a horizontal view of an embodiment of a construction arrangement of an elevator.
Figure 3:
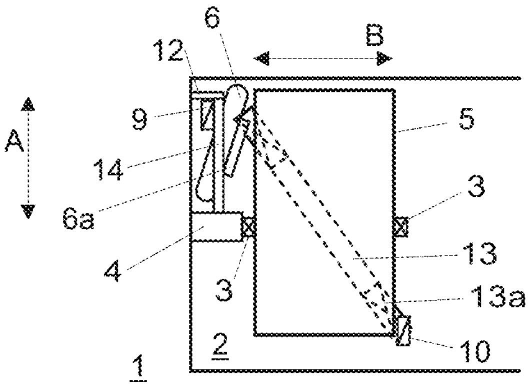
FIG. 3 illustrates a top view of an embodiment of a construction arrangement of an elevator.

FIG. 2 illustrates a horizontal view and FIG. 3 illustrates a top view of an embodiment of a construction arrangement of an elevator comprising a hoistway 2 formed in a building 1. The arrangement comprises elevator car guide rails 3 mounted by car guide rail brackets 4 to the structure of the hoistway 2, such as a wall. The car guide rails 3 are assembled of a plurality of car guide rail elements. The elevator car guide rail elements are mounted vertically above each other to form vertical car guide rail lines. An elevator car 5 is arranged movable on the car guide rails 3.

In an embodiment the arrangement comprises a hoisting machine 6, counterweight guide rails 7, a counterweight 8, a first rope fixing 9, a second rope fixing 10 and a roping 11. The counterweight guide rails 7 are assembled of a plurality of counterweight guide rail elements mounted by counterweight guide rail brackets 12 to the structure of the hoistway 2, such as a wall. The counterweight guide rail elements are mounted vertically above each other to form vertical counterweight guide rail lines. The counterweight 8 is arranged movable on the counterweight guide rails 7. A pulley beam 13 is attached to the underside of the car 5 for the roping 11. The pulley beam 13 is provided with a rope pulley 13*a* at both ends. In general, a rope path formed of rope pulleys 13*a* is formed to the underside of the car 5.

The hoisting machine 6 is mounted above the counterweight 8 substantially between a car guide rail 3 and a counterweight guide rail 7. The hoisting machine 6 may be positioned either with a drive wheel 6*a* towards the wall of the hoistway 2 or towards the car 5, depending on the type of rail brackets, the type of hoisting machine used, and the space available for the hoisting roping between the structure of the hoistway and the car 5.

In an embodiment the hoisting machine 6 is placed on, in other words, in front of the counterweight guide rail 7, when viewed horizontally. Thus, the counterweight guide rail is behind the hoisting machine when the hoisting machine is installed in place.

In an embodiment the hoisting machine 6 is mounted above the counterweight 8 by means of a hoisting machine mounting structure 14 which is preferably a bracket or a support beam. In an embodiment the mounting structure 14 is mounted between the car guide rail 3 and the counterweight guide rail 7. Said mounting structure may be mounted to the car guide rail and the counterweight guide rail. In an embodiment the mounting structure 14 is mounted to the car guide rail brackets 4 and the counterweight guide rail brackets 12.

The hoisting machine 6 is installed immobile, in other words vertically stationary, using said hoisting machine mounting structure 14 for temporary mounting during construction time use of the elevator.

In an embodiment the mounting structure 14 is mounted on the backs of the guide rails 3, 7.

In an embodiment the hoisting machine 6 and the first rope fixing 9 are mounted on the backs of the guide rails 3, 7.

In an embodiment the mounting structure 14 comprises an integrated first rope fixing 9 for a plurality of hoisting ropes 11, additionally to the mounting of the hoisting machine 6.

In an embodiment the hoisting machine and the first rope fixing may be mounted by means of the mounting structure 14 on the backs of the guide rails 3, 7.

The mounting structure 14 may be attached directly to the hoistway 2 structure, such as walls, so that the hoisting machine is mounted substantially between the car guide rail and the counterweight guide rail, but the attachment to the hoistway structure is not required due to the advantageous attachment to the guide rails 3, 7.

Figure 4:
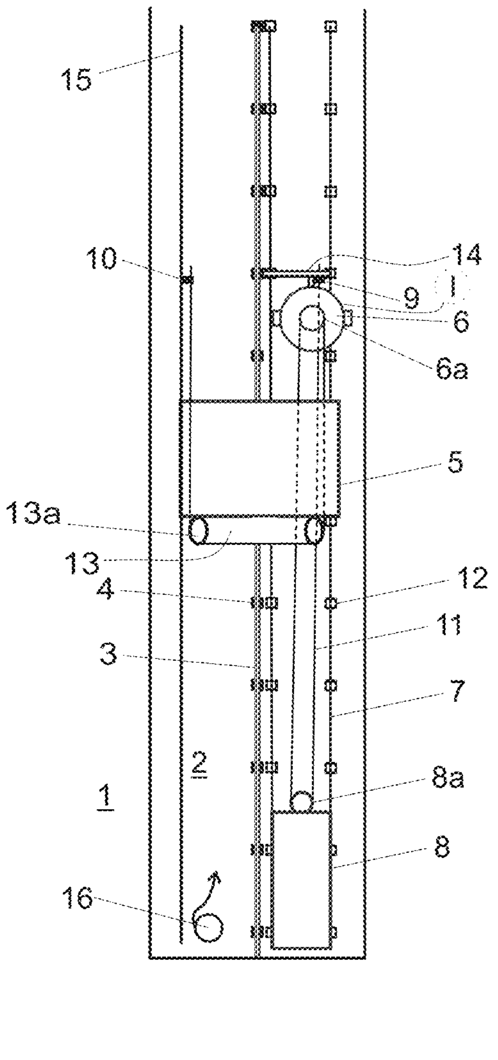
FIG. 4 illustrates the arrangement shown FIG. 2 provided with guide rails above an elevator hoisting machine which is in a lower first installation position, before the hoisting machine is moved up.
Figure 5:
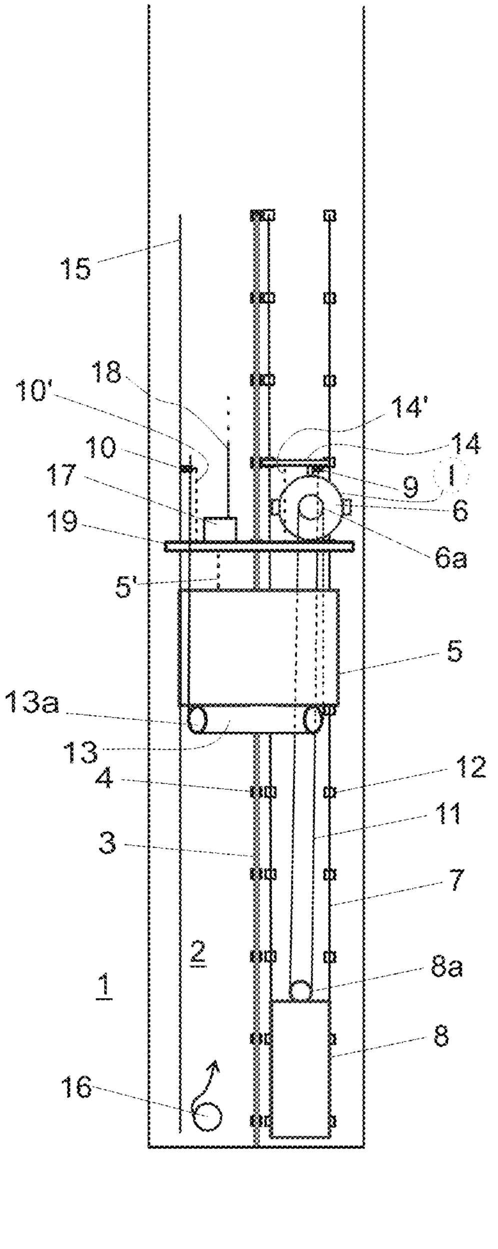
FIG. 5 illustrates, additionally to FIG. 4, an installation platform forming a hoisting arrangement for moving elevator components during an elevator jump.
Figure 6:
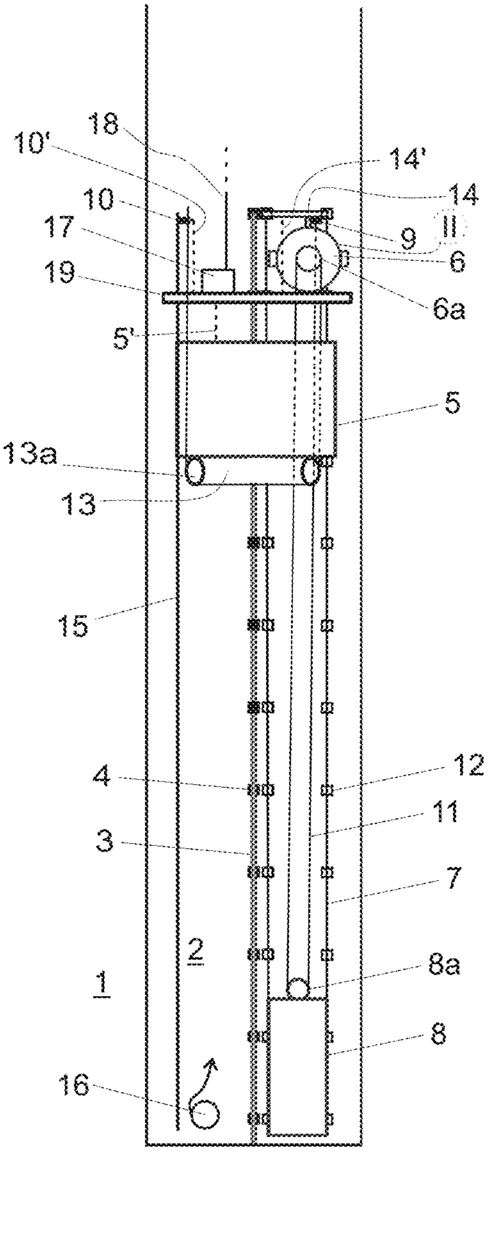
FIG. 6 illustrates the installation platform moving elevator components to an upper second installation position.
Figure 7:
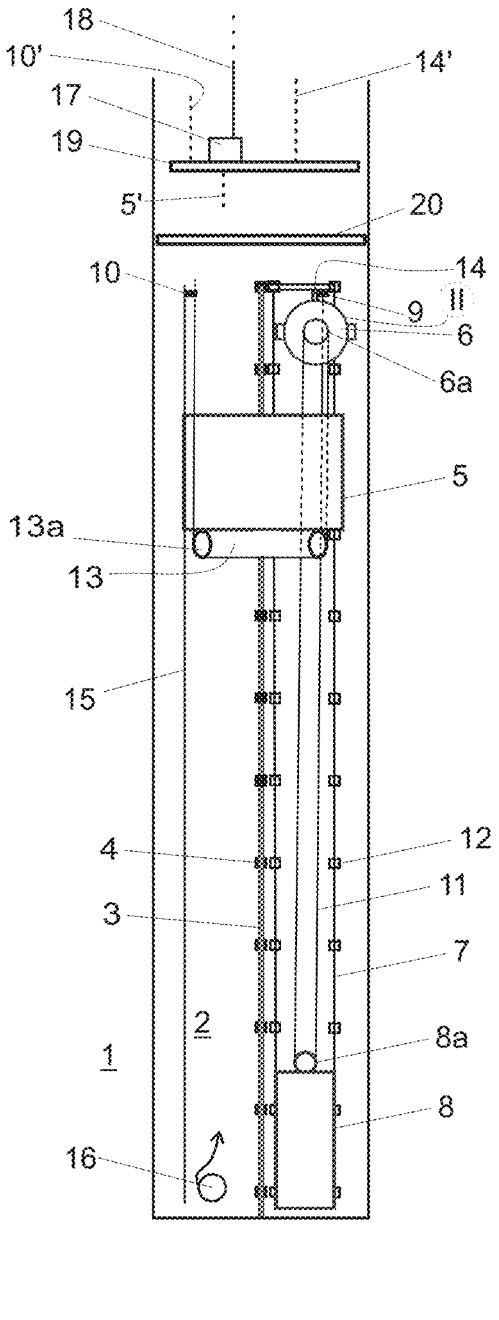
FIG. 7 illustrates elevator components mounted in place after said elevator jump.

The hoisting machine 6 is moved from a first installation position I, a lower position I in the hoistway 2 shown in FIGS. 2, 4 and 5 to the second installation position II, an upper position II shown in FIGS. 6 and 7 such as an upper end of the hoistway 2 constructed so far. Before mounting the hoisting machine 6 in the upper position II, the hoistway 2 shown in FIGS. 4 and 5 is provided with car guide rails 3 and counterweight guide rails 7 mounted to the hoistway structure by means of corresponding car guide rail brackets 4 and counterweight guide rail brackets 12.

By mounting the hoisting machine 6 between the car guide rail 3 and the counterweight guide rail 7, the same number of guide rail elements can always be installed above the hoisting machine 6, so that the correct number of car guide rail 3 elements, counterweight guide rail 7 elements and corresponding rail brackets 4, 12 is easy to provide available for the next guide rail installation stage above the hoisting machine mounting structure 14.

The hoisting machine 6 is positioned between the car guide rail 3 and the counterweight guide rail 7 so that the hoisting machine and the hoisting machine mounting structure 14 can be moved upwards during the stretching process without substantial additional work. Thus, for example, work relating to detaching and attaching the car guide rail brackets or moving the roping to the other side of the car guide rail brackets can be avoided.

The pulley beam 13 provided with a rope pulley 13*a* at both ends is preferably skewed, in other words, turned crosswise compared to the conventional parallel pulley beam, which allows a more efficient use of the hoistway size. This is advantageous in terms of increased elevator car size.

The mounting of the hoisting machine between the car and counterweight rails allows the use of wider and narrower counterweights 8 as shown with arrow A in FIG. 3, thus achieving greater utilization of the hoistway 2. The width of the counterweight 8 can be increased by using omega brackets, wherein width of the car 5 can be increased as shown by arrow B in FIG. 3. This will bring great benefits to the customer in terms of increased elevator car size.

The ropes 11 pass from the first rope fixing 9 integrated with the hoisting machine mounting structure 14 down to the counterweight pulley 8*a*, which may be skewed. The skewed position of the counterweight pulley 8*a* (or a skewed counterweight pulley beam comprising a pulley at both ends) makes it easier to locate the roping 11 in its narrow space. Thereafter the ropes pass up to the hoisting machine 6, particularly around a drive wheel 6*a* of the hoisting machine, and from there down under the car 5, via the pulley beam 13, up to the second rope fixing 10 on the opposite side of the hoistway 2, preferably crosswise or diagonally on the other side of the hoistway. Preferably the second rope fixing 10 is mounted on a single rail 15 provided in the hoistway 2 and attached to the structure of the hoistway.

A rope supply storage 16 is provided, from where more rope is fed into the above-described hoisting roping system 11 as the elevator car traveling path is lengthened. The rope supply storage preferably comprises rope reels 16 positioned at the bottom of the hoistway 2.

In general, the rope supply storage is located such that more rope may be fed to the hoisting roping system via the first rope fixing 9 integrated with the hoisting machine mounting structure or via the second rope fixing 10.

In general, the hoisting roping need not be transported or stored as a reel, although this is disclosed in the simplistic version of FIGS. 2 and 4-7, since a tail or a loop of the hoisting roping could be left in the bottom parts of the hoistway.

As shown in FIG. 4, making the elevator jump is faster than in prior art, as the car guide rails 3, the counterweight guide rails 7, and the corresponding rail brackets 4, 12 are installed at once in the correct position and do not need to be changed during jump.

As shown in FIGS. 5-7, the moving of the hoisting machine 6 and the extending of the roping 11 may be done by means of a hoisting arrangement preferably comprising a hoisting device 17, a flexible member 18 and an installation platform 19 disposed above the car 5. In FIGS. 5-7 the hoisting device 17 is connected by the flexible member 18 to the installation platform 19.

In general, the hoisting arrangement can be any kind of arrangement suitable for hoisting the hoisting machine 6 and other elevator equipment in the hoistway 2. In general, the hoisting device 17 can be any kind of device suitable for pulling the flexible member 18 capable of hoisting loads in the hoistway 2. In general, the hoisting device preferably comprises a motor and an engaging member such as a drum or roller engageable with the flexible member and rotatable with the motor. For example, the hoisting device can be a Tirak™-hoist, or a drum or roller around which flexible member can be rolled by motorized rotation of the drum or roller.

Figure 8:
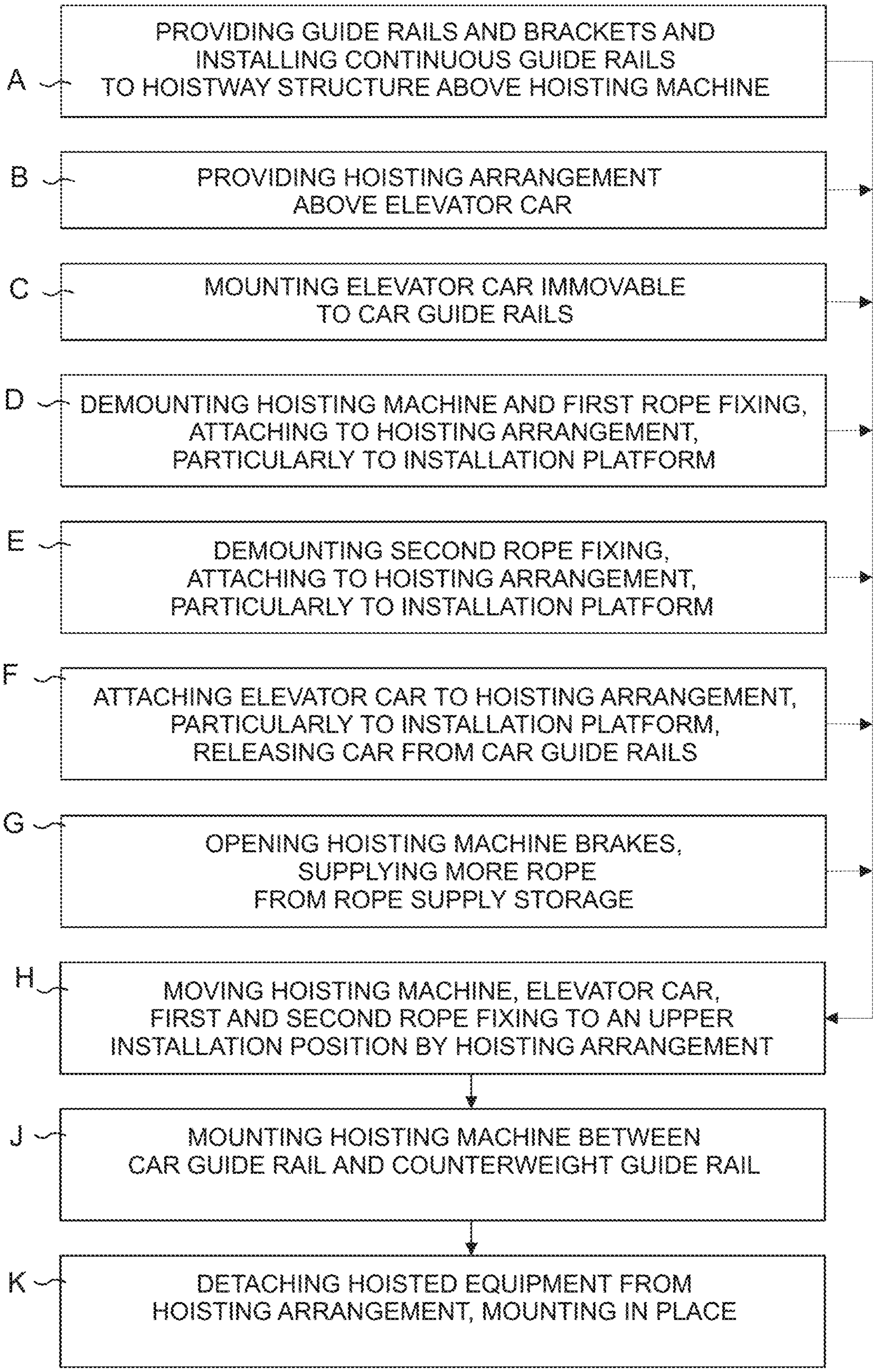
FIG. 8 is a flow diagram of a method that can be implemented in constructing the arrangement of FIGS. 2 to 7.

In the following an example method for constructing an elevator is described with the help of FIGS. 2 to 8. FIG. 8 illustrates an example flow diagram of a method for constructing an elevator. When making an elevator jump, car guide rail 3 elements, counterweight guide rail 7 elements and corresponding rail brackets 4, 12 are provided in the correct number and installed in continuously in the hoistway 2 structure above the hoisting machine 6 mounted in the first installation position I, particularly above the mounting structure 14 as shown in FIG. 4 (reference sign A in FIG. 8). Thus, said guide rails 3, 7 may, already before demounting the hoisting machine 6, form continuous car guide rail lines for moving the car 5 and counterweight guide rail lines for moving the counterweight 8 below the coming mounting position of the hoisting machine 6 in the second installation position II.

The hoisting arrangement is provided above the car as described above (B in FIG. 8).

When the elevator jump is to be made, the car 5 is mounted immovable to the car guide rails 3 (C in FIG. 8). The mounting immovable and the following demounting of the car may be provided by openable and closable locks, clamps, grippers etc.

In FIG. 5 the installation platform 19 is driven flush with the lower side of the hoisting machine 6 mounted by the mounting structure 14 between the car guide rail 3 and the counterweight guide rail 7.

The hoisting machine 6 mounting structure 14 supporting the hoisting machine 6 and the first rope fixing 9, which may be integrated to said mounting structure, are demounted, particularly from the car guide rail and the counterweight guide rail, and attached (shown by reference sign 14') to the installation platform 19 to be supported by the installation platform (D in FIG. 8).

The counterweight 8 may rest on buffers at the bottom of the hoistway 2 during the jump or the counterweight 8 may be fixed immobile elsewhere on the counterweight guide rails 7.

The second rope fixing 10 mounted immobile on the single rail 15 is demounted and attached to the installation platform 19 (E in FIG. 8) to be supported by the installation platform (shown by reference sign 10'). The mounting immovable and the following demounting of the second rope fixing 10 may be provided by openable and closable locks, clamps, grippers etc.

The car 5 is attached to the installation platform 19 (shown by reference sign 5'). The car is released from the car guide rails 3 and is now supported by the installation platform (F in FIG. 8).

Hoisting machine 6 brakes are opened and relevant elevator components are moved and mounted to the upper installation position II (G in FIG. 8).

In FIG. 6, the hoisting machine 6, the first rope fixing 9, the car 5, and the second rope fixing 10 are moved to the upper installation position II by the hoisting arrangement (H in FIG. 8), preferably by hoisting the installation platform 19, using the hoisting device 17 which is connected by the flexible member 18 to the installation platform 19. During the hoist, more rope 11 is released into the roping system from the rope supply storage 16, particularly from the bottom of the hoistway.

In the upper installation position II, the hoisted equipment is mounted immobile in place. The hoisting machine mounting structure 14 with the hoisting machine 6 and the first rope fixing 9 is mounted immobile between the car guide rail 3 and the counterweight guide rail 7 (J in FIG. 8) and detached from the hoisting arrangement. The car 5 is detached from the installation platform 19 to be supported by the roping. The second rope fixing 10 is detached from the installation platform 19 and mounted immobile on the single rail 15 (K in FIG. 8).

After the jump, the elevator will be returned to customer use.

Before the elevator is put into service, a temporary protection deck 20 may be installed in the elevator hoistway 2 to serve as a roof for the elevator and as a floor for the installation above. The elevator is commissioned and put into service for the customer and installation continues above the elevator in use.

The described method and arrangement are used to extend several times the travel length of the elevator during construction. When the building 1 is at full height, a final hoisting motor and electrical system can be installed at the top of the hoistway while the operating elevator is running at the bottom part of the hoistway 2. Thereafter the construction time electrical installations for power tools, etc., may be removed and the elevator can be equipped with new ropes.

In the application, several details have been presented as preferred. This means that they are preferred, however they are not to be understood as necessary, because it may be that the arrangement can be implemented also without them.

It is to be understood that the above description and the accompanying figures are only intended to illustrate the present invention. It will be obvious to a person skilled in the art that the invention can be varied and modified without departing from the scope of the invention.

The invention claimed is:

1. A construction arrangement of an elevator comprising a hoistway, at least one car guide rail mounted to a wall of hoistway and at least one counterweight guide rail mounted to a structure of the hoistway and extending in a vertical direction, an elevator car arranged movable on said at least one car guide rail, the at least one car guide rail between the elevator car and the wall of the hoistway in a first horizontal plane, the first horizontal plane perpendicular to the vertical direction, a counterweight arranged movable on said at least one counterweight guide rail, a hoisting machine arranged directly above the counterweight, wherein the hoisting machine is mounted between said at least one car guide rail and said at least one counterweight guide rail, and the wall of the hoistway, the at least one counterweight guide rail, the hoisting machine and a vertical projection of the elevator car overlapping in a second horizontal plane along a first direction, the first direction periocular to the wall of the hoistway, the at least one counterweight guide rail is between the hoisting machine and the wall of the hoistway in the second horizontal plane, the second horizontal plane parallel to the first horizontal plane, and a vertical projection of the hoisting machine being separate from the at least one counterweight guide rail and the vertical projection of the elevator car.

2. The arrangement according to claim 1, wherein the hoisting machine is mounted by means of a mounting structure between said at least one car guide rail and said at least one counterweight guide rail, and the mounting structure is mounted on a back of said at least one car guide rail and on a back of said at least one counterweight guide rail.

3. The arrangement according to claim 2, wherein said at least one car guide rail is mounted by car guide rail brackets to the structure of the hoistway and said at least one counterweight guide rail is mounted by counterweight guide rail brackets to the structure of the hoistway, and the mounting structure is mounted to a car guide rail bracket and a counterweight guide rail bracket.

4. The arrangement according to claim 2, wherein additionally to the mounting of the hoisting machine to the mounting structure, the mounting structure comprises an integrated first rope fixing for a plurality of hoisting ropes comprised by the arrangement.

5. The arrangement according to claim 1, wherein the hoisting machine comprises a drive wheel positioned towards the structure of the hoistway which provides mounting structure for an adjacent one of the at least one car guide rail, or wherein the hoisting machine comprises the drive wheel positioned towards the elevator car.

6. The arrangement according to claim 1, wherein the hoisting machine is placed on the at least one counterweight guide rail, when viewed in a horizontal direction, and/or wherein the hoisting machine is configured to be demounted from a first installation position in the hoistway and to be mounted to an upper second installation position in the hoistway, and the second installation position is provided with second car guide rails and second counterweight guide rails forming continuing car guide rail lines and continuing counterweight guide rail lines to a bottom portion of the hoistway before said demounting.

7. The arrangement according to claim 1, wherein the hoisting machine is askew from the wall of the hoistway.

8. The arrangement according to claim 1, wherein the vertical projection of the hoisting machine is separate from the at least one car guide rail.

9. A method for constructing an elevator comprising providing a construction arrangement according to claim 1, and moving the hoisting machine from a first installation position to an upper second installation position in the hoistway, and mounting the hoisting machine between said at least one car guide rail and said at least one counterweight guide rail.

10. The method according to claim 9, wherein additionally to the mounting of the hoisting machine to a mounting structure, integrating a first rope fixing to the mounting structure to form an integrated first rope fixing for a plurality of hoisting ropes.

11. The method according to claim 9, wherein positioning a drive wheel comprised by the hoisting machine towards the structure of the hoistway which provides mounting structure for an adjacent one of the at least one car guide rail, or wherein positioning the drive wheel comprised by the hoisting machine towards the elevator car.

12. The method according to claim 9, further including placing the hoisting machine on the at least one counterweight guide rail, when viewed in a horizontal direction.

13. The method according to claim 9, wherein mounting second car guide rails and second counterweight guide rails in the hoistway upper second installation position above the hoisting machine thereby forming continuing car guide rail lines and continuing counterweight guide rail lines to a bottom portion of the hoistway, when the hoisting machine is mounted in place in the first installation position, and wherein demounting the hoisting machine from the first installation position and mounting the hoisting machine to the upper second installation position.

14. The method according to claim 13, wherein demounting a second rope fixing comprised by the construction arrangement from the first installation position and mounting second rope fixing to the upper second installation position.

15. The method according to claim 9, wherein moving the hoisting machine mounted to a mounting structure, together with a first rope fixing integrated to said mounting structure, between said at least one car guide rail and said at least one counterweight guide rail, and wherein demounting the mounting structure from between said at least one car guide rail and said at least one counterweight guide rail in the first installation position, and mounting the mounting structure between said at least one car guide rail and said at least one counterweight guide rail in the upper second installation position.

16. The method according to claim 9, wherein providing a hoisting arrangement in the hoistway above the elevator car capable of hoisting loads in the hoistway, the hoisting arrangement comprising a hoisting device, a flexible member, and an installation platform.

17. The method according to claim 9, wherein attaching to a hoisting arrangement, and supporting and moving, simultaneously, by said hoisting arrangement from the first installation position to the upper second installation position, includes the hoisting machine; a first rope fixing comprised by the construction arrangement; a second rope fixing comprised by the construction arrangement; the elevator car; and a mounting structure comprised by the construction arrangement together with the hoisting machine and the first rope fixing are attached to an installation platform, and supported and moved by said installation platform.

* * * * *